(12) United States Patent
Kang et al.

(10) Patent No.: US 10,924,714 B2
(45) Date of Patent: Feb. 16, 2021

(54) OPTICAL COMMUNICATION SYSTEM AND METHOD CAPABLE OF MONITORING UNDERWATER INFORMATION IN REAL TIME

(71) Applicant: BORsys Corp., Busan (KR)

(72) Inventors: Jin Il Kang, Busan (KR); Hyun Joong Son, Seoul (KR)

(73) Assignee: BORSYS CORP., Busan (KR)

( * ) Notice: Subject to any disclaimer, the term of this patent is extended or adjusted under 35 U.S.C. 154(b) by 0 days.

(21) Appl. No.: 16/676,200

(22) Filed: Nov. 6, 2019

(65) Prior Publication Data

US 2020/0154081 A1 May 14, 2020

(30) Foreign Application Priority Data

Nov. 6, 2018 (KR) .......................... 10-2018-0134952

(51) Int. Cl.
| | |
|---|---|
| *H04B 10/80* | (2013.01) |
| *H04B 10/114* | (2013.01) |
| *H04B 10/40* | (2013.01) |
| *H04N 7/22* | (2006.01) |
| *B25J 9/16* | (2006.01) |
| *H04B 10/50* | (2013.01) |

(Continued)

(52) U.S. Cl.
CPC ............ *H04N 7/22* (2013.01); *B25J 9/1697* (2013.01); *H04B 10/1143* (2013.01); *H04B 10/40* (2013.01); *H04B 10/50* (2013.01); *H04B 10/66* (2013.01); *H04B 10/80* (2013.01); *H04N 5/23203* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 5,181,135 | A * | 1/1993 | Keeler ................... | G01S 7/484 356/342 |
| 8,340,526 | B2 * | 12/2012 | Camilli ................ | H04B 10/272 398/104 |
| 10,516,489 | B1 * | 12/2019 | Liu ........................ | H04B 10/80 |

(Continued)

FOREIGN PATENT DOCUMENTS

| | | |
|---|---|---|
| KR | 10-1335775 B1 | 12/2013 |
| KR | 101335775 B1 * | 12/2013 |

(Continued)

*Primary Examiner* — Li Liu
(74) *Attorney, Agent, or Firm* — Christensen O'Connor Johnson Kindness PLLC (57) ABSTRACT

It is disclosed optical communication system and method capable or monitoring underwater information in real time. An optical communication system may be configured to include a first optical communication module configured with a photographing unit which is installed on objects moving underwater and photographs underwater pictures or images and a first optical transceiver module for transmitting and receiving image information for the underwater pictures or images photographed in the photographing unit; a second optical communication module for receiving the image information from the first optical transceiver module of the first optical communication module and transmitting the image information to an external device or a displaying unit.

5 Claims, 5 Drawing Sheets (51) Int. Cl.
*H04B 10/66* (2013.01)
*H04N 5/232* (2006.01)

(56) References Cited

U.S. PATENT DOCUMENTS

2014/0212142 A1* 7/2014 Doniec .................. H04B 10/80
                                                            398/104
2015/0120045 A1   4/2015 Tan et al.
2016/0121009 A1*  5/2016 Farr .................... G02B 19/0019
                                                            250/492.1

FOREIGN PATENT DOCUMENTS

KR      10-1595877  B1   2/2016
KR   10-2017-0141918 A   12/2017

* cited by examiner

OPTICAL COMMUNICATION SYSTEM AND METHOD CAPABLE OF MONITORING UNDERWATER INFORMATION IN REAL TIME

CROSS-REFERENCE TO RELATED APPLICATION

This application claims the priority benefit of Korean Patent Application No. 10-2018-0134952, filed on Nov. 6, 2018, in the Korean Intellectual Property Office, the disclosure of which is incorporated herein by reference.

BACKGROUND

1. Field of the Invention

The below example embodiments relate to underwater optical communication system and method, more particularly, optical communication system and method capable of monitoring underwater information in real time.

2. Description of Related Art

In general, an aquarium is a space where water is trapped in glass or transparent plastic and various creatures are put inside there to see their ecology or activities and the like. Recently, there are many places where aquariums are made in large sizes in order that many people see various creatures from around the world.

As described above, since underwater creatures may be seen only from the outside, the aquariums may have a limited effect of watching. To maximize the effect, a diver photographs the inside of the aquarium by using a underwater camera, and records this, and by displaying the photographed contents through a display device or a computer, it may be possible to show the state of the creatures more vividly to visitors, so enjoy of watching in the aquarium may be added.

Although there is a method for photographing the inside of the aquarium by using the diver, this method is hard to closely observe behaviors of the creatures because it is difficult to photograph close-ups of the creatures according to reactions of underwater creatures avoiding the diver's access. Also, since the photograph is possible within the activity scope of the diver watching and photographing the place underwater, the photographing range is limited. In addition, since the video photographed by the diver may not be sent to the visitors in real-time, there is inconvenience that the video should be recorded and then displayed, and also, great cost is required because multiple expensive underwater cameras are operated and many divers photograph in order to take simultaneously various scenes of ecosystem occurred underwater. Above all, the aquarium is for watching the natural ecology of underwater creatures, so the artificial scenes are hard to receive positive responses from the visitors.

SUMMARY

At least one example embodiment describes optical communication system and method capable of monitoring underwater information in real time, more particularly, provides a technology that transmits the state of the inside of an aquarium from the perspective of underwater creatures by attaching miniature cameras and optical transceiver modules attachable to the underwater creatures to the underwater creatures to the outside of the aquarium so that it may be watched from the outside in real time.

At least one example embodiment provides optical communication system and method that it may naturally access to other creatures by attaching optical transceiver modules integrated with miniature cameras to underwater creatures and may photograph real time close-up.

Also, at least one example embodiment provides optical communication system and method which may confirm transmitted images in the outside in real time by transmitting photography information to the outside of the aquarium in real time by using optical communication.

According to an aspect of at least one example embodiment, an optical communication system may be configured to include a first optical communication module configured with a photographing unit which is installed on objects moving underwater and photographs underwater pictures or images and a first optical transceiver module for transmitting and receiving image information for the photographed underwater pictures or images; and a second optical communication module for receiving the image information from the first optical transceiver module of the first optical communication module and transmitting the image information to an external device or a displaying unit.

Here, it may further include a controlling unit for receiving and processing the image information from the second optical communication module, and then, transmitting the processed image information to the external device or the displaying unit.

The controlling unit may include multiplexing and demultiplexing unit for processing the multiple image information received from the plurality of second optical communication modules to be selectively transmitted to the external device or the displaying unit.

It may further include a displaying unit for receiving the processed image information from the controlling unit and providing the processed image information in real time.

The first optical communication module may include a main body; the photographing unit consisting of a miniature camera configured on one side of the main body; an image processing unit for converting real-time images photographed in the photographing unit to bit array in order to transmit the images; and a first optical transmitter module configured on wall surface part of the main body, and converting signals received from the image processing unit to optical signals and transmitting the optical signals to the outside, and may be attached to an underwater creature or an underwater robot to move underwater and photographs underwater environment or another underwater creature.

The first optical communication module may further include a first optical receiver module configured on wall surface part of the main body and receiving optical signals from the outside; a control signal unit receiving the optical signals from the first optical receiver module and generating control signals; and a driving unit driven by driving unit according to the control signals received from the control signal unit and rotating the main body.

The second optical communication module may include a second optical receiver module receiving optical signals from the first optical transmitter module of the first optical communication module; a processing and communicating unit transmitting the optical signals received from the second optical receiver module to the external device or the displaying unit, and receiving control signals from the external device or the displaying unit; and a second optical transmitter module transmitting the control signals to the first optical transmitter module as optical signals.

The controlling unit may transmit the control signals for operation control of the underwater robot in the aquarium or operation control of the photographing unit to the second optical communication module, and the second optical communication module may be installed in plural inside or outside of the aquarium, and transmit the control signals to the underwater robot or the first optical communication module.

It may further include an inputting unit for receiving input of instruction for controlling operation of the underwater robot in the aquarium or rotation control instruction of the first optical communication module attached to the underwater creature and transmitting the instructions to the controlling unit.

According to another aspect of at least one example embodiment, an optical communication module may include a main body; the photographing unit consisting of a miniature camera configured on one side of the main body; an image processing unit for converting real-time images photographed in the photographing unit to bit array in order to transmit the images; an optical transmitter module configured on wall surface part of the main body, and converting signals received from the image processing unit to optical signals and transmitting the optical signals to the outside; an optical receiver module configured on wall surface part of the main body, and receiving the optical signals from the outside; a control signal unit for receiving the optical signals from the optical receiver module and generating control signal; and a driving unit driven by driving unit according to the control signal received from the control signal unit and rotating the main body. At this time, the optical communication module may be attached to the underwater creature or underwater robot to move underwater and photograph underwater environment or another underwater creature.

According to another aspect of at least one example embodiment, an optical communication method may be configured to include receiving image information for underwater pictures or images photographed from the photographing unit installed on objects moving underwater and installed underwater or within a certain distance from underwater through an optical transceiver module; and transmitting the received image information to an external device or a displaying unit.

Here, it may further include photographing underwater pictures or images through the photographing unit installed on objects moving underwater; and transmitting image information for the photographed underwater pictures or images to the optical transceiver module installed underwater or within a certain distance from underwater by using the optical transceiver module of the photographing unit.

Also, it may further include transmitting and processing the image information in the controlling unit in order to transmit the image information to the external device or the displaying unit, and then, transmitting the processed image information to the external device or the displaying unit.

The transmitting and processing the image information in the controlling unit and then transmitting the processed information to the external device or the displaying unit may process the received multiple image information to be selectively transmitted to the external device or the displaying unit through multiplexing and demultiplexing unit.

It may further include receiving control signals for operation control of an underwater robot which is an object in the aquarium or control signals for operation control of the photographing unit; and transmitting the control signals to the underwater robot or the photographing unit.

The receiving control signals for operation control of the underwater robot which is the object or operation control of the photographing unit may receive input of instruction for operation control of the underwater robot in the aquarium or instruction for rotation control of the photographing unit attached to underwater creature through a terminal, and then, receive the control signals.

According to example embodiments, it may provide optical communication system and method which may be naturally accessible to other creatures by attaching an optical transceiver module integrated with a miniature camera, and may photograph close-ups in real time.

Also, according to example embodiments, it may provide optical communication system and method which may confirm transmitted images from the outside in real time by transmitting photograph information to the outside of the aquarium by using optical communication.

DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, some example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Shapes or sizes of elements in the drawings may be exaggerated for more clearly description.

The following example embodiments relate to a technology that attaches a miniature camera and an optical transceiver module attachable to underwater creatures to an underwater creature and transmits the state of the inside of an aquarium from the point of view of the underwater creature in order to see the state from the outside in real time.

According to example embodiments, it may provide optical communication system and method capable of monitoring underwater information in real time that attach an optical transceiver module integrated with a miniature camera to underwater creatures and naturally photographs close-ups for other creatures in real time, and transmitted image may be seen from the outside in real time by transmitting photographed information to the outside of the aquarium in real time by using optical communication.

Figure 1:
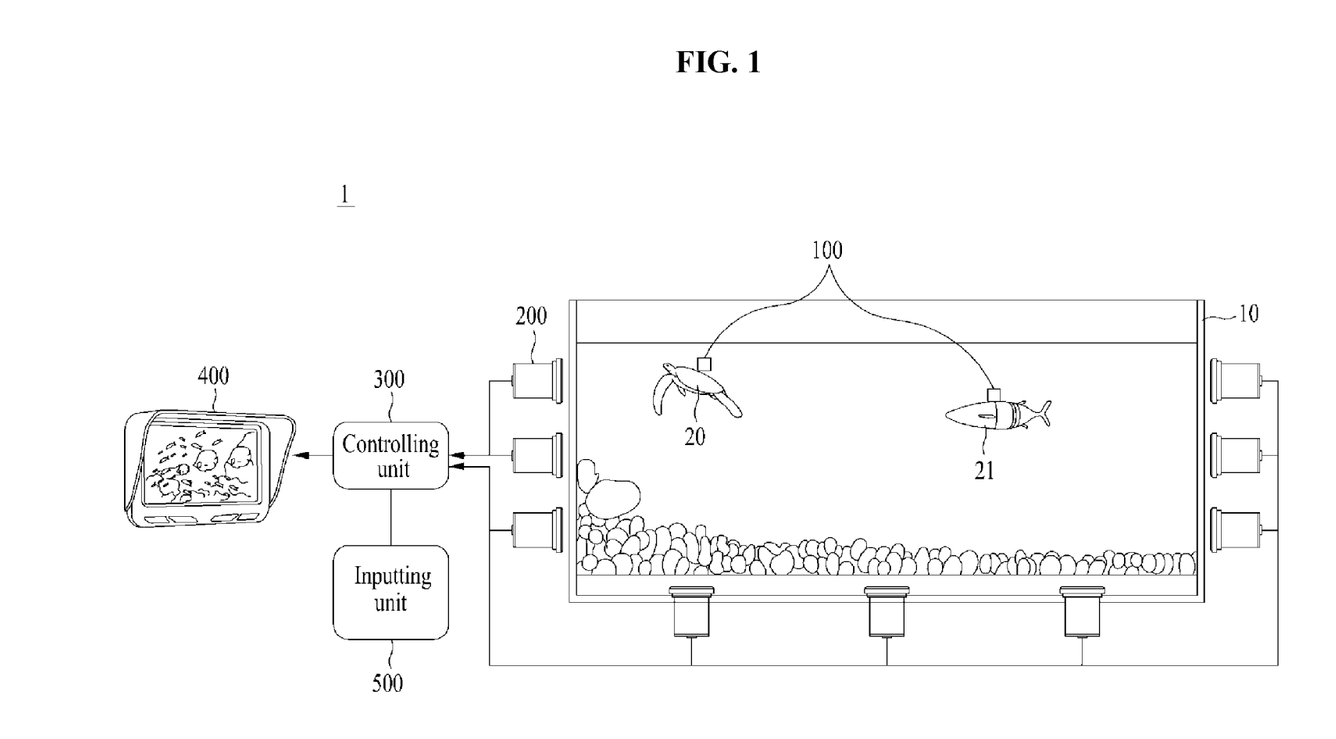
FIG. 1 is a drawing schematically illustrating an optical communication system capable of monitoring underwater information in real time according to an example of embodiments.

FIG. 1 is a drawing schematically illustrating an optical communication system capable of monitoring underwater information in real time according to an example of embodiments.

Referring to FIG. 1, an optical communication system 1 capable of monitoring underwater information in real time transmits pictures or images photographed with a camera or a sonar scanner underwater to ground or outside of an aquarium 10 at high speed, present state or condition of underwater may be seen in real time through a terminal installed at the outside. In the below, the optical communication system and method capable of monitoring underwater information in real time will be simply referred as an optical communication system or an optical communication method.

The optical communication system 1 may be configured to include a first optical communication module 100 and a second optical communication module. According to example embodiments, the optical communication system 1 may be configured to further include a controlling unit 300 and a displaying unit 400, and an inputting unit 500.

First, the first optical communication module 100, which is for photographing underwater pictures or images, may be configured to include a photographing unit and a first optical transceiver module. The detailed structure of the first optical communication module 100 will be described below with referring to FIG. 2, and here, it will be briefly described.

The photographing unit may be installed on an object moving underwater and photograph underwater pictures or images. Such photographing unit may be a miniature camera attached to an underwater creature 20 or an underwater robot 21. Also, the photographing unit may be a sonar scanner as well as a camera.

The first transceiver module may transmit and receive image information for underwater pictures or images photographed from the photographing unit by using optical communication at high speed.

In addition, a second optical communication module 200 may receive optical signals transmitted through the first optical communication module 100 attached to the underwater creature 20 and the underwater robot 21 at high speed or transmit control signals to the underwater robot 21 and the like. Such second optical communication module 200 may be configured at the outside adjacent to underwater.

The second optical communication module 200 may include a second optical transceiver module, receive image information from the first transceiver module of the first optical communication module 100 through the second optical transceiver module, and transmit the received image information to an external device or the displaying unit 400. At this time, the second optical communication module 200 may directly transmit the image information to the external device or the displaying unit 400, but may transmit it through the controlling unit 300.

Meanwhile, the second optical communication module 200 may be configured in plural, and the second optical communication module 200 located at a distance adjacent to the moving first optical communication module 100 is selected and receive image information from the first optical communication module 100 or transmit control signals to the first optical communication module 100.

For example, the first optical communication module 100 may be attached to the underwater creature 20 or the underwater robot inside the aquarium 10, and the second optical communication module 200 may be an underwater optical communication module based on LED (Light-Emitting Diode) installed in plural inside or outside the aquarium. The detailed structure of the second optical communication module 200 will be described below with referring to FIGS. 3 and 4.

The controlling unit 300 may receive and process the image information from the second optical communication module 200, and then, transmit the processed image information to the external device or the displaying unit 400. Particularly, the controlling unit 300 may receive and process multiple image information from the plurality of second optical communication modules 200, and then, transmit the processed image information to the external device or the displaying unit 400. For example, the controlling unit 300 may process multiple image information received from the plurality of second optical communication modules 200 to be selectively transmitted to the external device or the displaying unit 400 through a multiplexing and demultiplexing unit having multiplexing and demultiplexing function.

For example, the controlling unit 300 may transmit control signals for operation control of the underwater robot 21 in the aquarium 10 to the second optical communication module 200 located adjacent to the first optical communication module 100 among the plurality of second optical communication modules 200 installed inside or outside the aquarium 10. Accordingly, the second optical communication module 200 located adjacent to the first optical communication module 100 may transmit control signals to the underwater robot 21.

As another example, the controlling unit 300 may transmit control signals for operation control of the photographing unit in the aquarium 10 to the second optical communication module 200 located adjacent to the first optical communication module 100 among the plurality of second optical communication modules 200 installed inside or outside. Accordingly, the second optical communication module 200 located adjacent to the first optical communication module 100 may transmit control signals for operation control of the photographing unit to the first optical communication module 100. It may be configured that there is a rotation axis driven by an electronic motor at the low part of the first optical communication module 100 so that the first optical transceiver module attached to the side surface may be rotated by receiving optical signals sent from the outside second optical transceiver module.

At this time, the controlling unit 300 may play a role giving instruction for controlling operation of the underwater robot 21 in the aquarium 10 and giving instruction to a driving unit (e.g., rotation motor) of the first optical communication module 100 by amplifying multiple image information received from the second optical communication module 200 installed inside and outside of glass wall surface of the aquarium 10 and converting it to bit signals.

In addition, the displaying unit 400 may receive the processed image information from the controlling unit 300 and provide images in real time. Particularly, the displaying unit 400 may be configured with a plurality of screens and variously show image information received from the second optical transmitter module installed inside and outside the aquarium 10 to outside the aquarium 10 through the controlling unit 300.

Also, the inputting unit 500 may receive instruction for controlling operation of the underwater robot 21 in the aquarium 10 or rotation control instruction of the first optical communication module 100 attached to the underwater creature 20 and transmit it to the controlling unit 300.

Here, the inputting unit 500 may be a terminal outside the aquarium 10, and may input instruction for controlling operation of the underwater robot 21 in the aquarium 10 and control instruction of the driving unit of the first optical communication module 100 attached to the underwater creature 20 through a terminal. For example, the terminal may be a mobile phone, a PMP (Portable Multimedia Player), a MID (Mobile Internet Device), a smart phone, a desktop, a tablet PC, a note book, a net book, a navigation, a data communication device, and the like.

Likewise, according to example embodiments, it may naturally access to other creatures by attaching an optical transceiver module integrated with a miniature camera to the underwater creature 20 and photograph close-ups. Also, it may confirm transmitting images at the outside in real time by transmitting photographing information to the aquarium 10 in real time by using optical communication.

An optical communication module according to another example embodiment may configured to include a main body, the photographing unit consisting of a miniature camera configured on one side of the main body, an image processing unit for converting real-time images photographed in the photographing unit to bit array in order to transmit the images, an optical transmitter module configured on wall surface part of the main body, and converting signals received from the image processing unit to optical signals and transmitting the optical signals to the outside, an optical receiver module configured on wall surface part of the main body, and receiving optical signals from the outside, a control signal unit receiving the optical signals from the optical receiver module and generating control signals, and a driving unit driven by a driving unit according to the control signals transmitted from the control signal unit and rotating the main body. An optical communication module according to another example embodiment will be more specifically described through the first optical communication module below.

Figure 2:
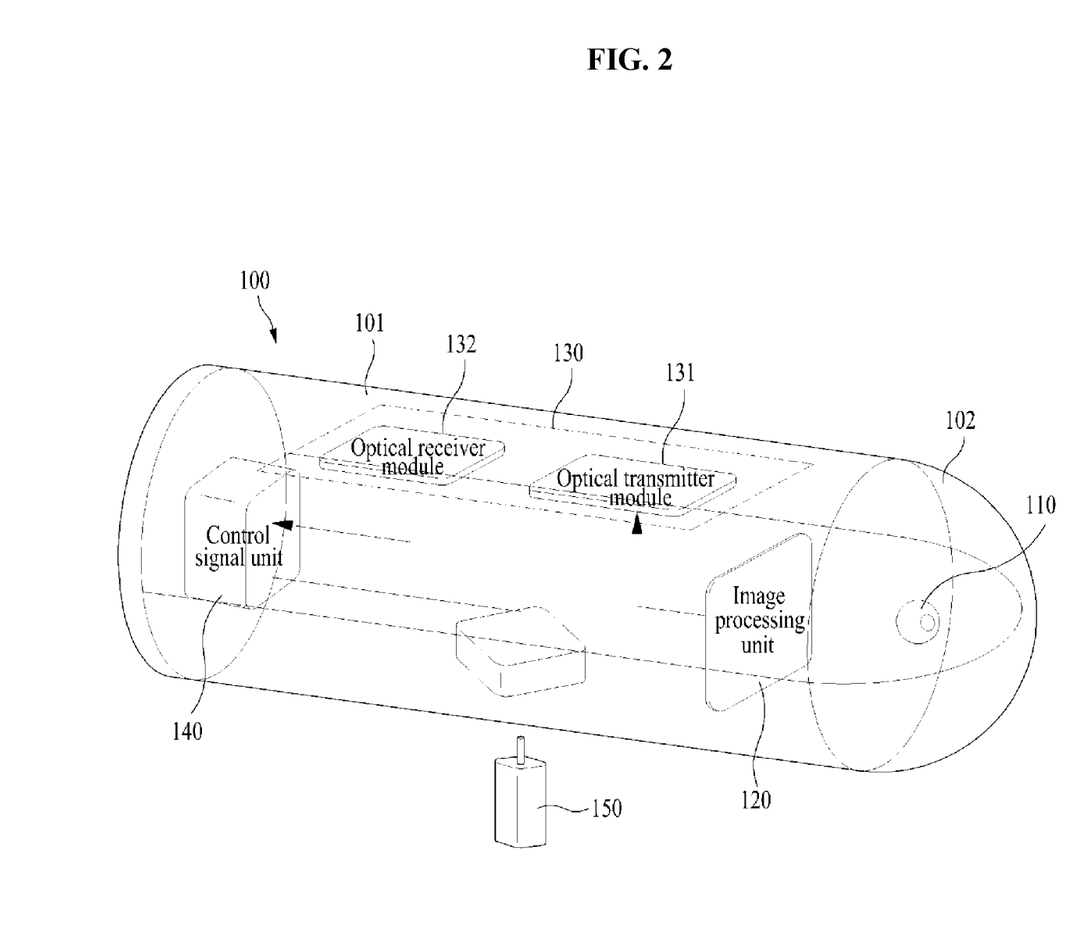
FIG. 2 is a drawing illustrating structure of a first optical communication module according to an example of embodiments.

FIG. 2 is a drawing illustrating structure of a first optical communication module according to an example of embodiments.

Referring to FIG. 2, a first optical communication module 100 may be configured to include a photographing unit 110 configured with an underwater camera attached to underwater creatures including fishes and the like or underwater robot, and a first optical transceiver module 130 which may transmit and receive underwater pictures or images photographed through them at high speed. In the below, the structure of the first optical communication module 100 will be more specifically described with an example.

The first optical communication module 100 may be attached to an underwater creature or underwater robot, move underwater, and photograph underwater environment or other underwater creatures, and may be configured to include a main body 101, the photographing unit 110, an image processing unit 120, and a first optical transmitter module 131. The first optical communication module 100 may further include a first optical receiver module 132, a control signal unit 140, a driving unit 150, and a power unit (not illustrated).

The photographing unit 110 may be configured with a miniature camera configured in one side of the main body 101. Meanwhile, a lens unit 102 may be configured in one side of the main body 101, and the photographing unit 110 may be configured inside of the lens unit 102.

The image processing unit 120 may convert real time images photographed from the photographing unit 110 to bit array to transmit the images.

The first optical transmitter module 131 may be configured on wall surface part of the main body 101, e.g., may be attached to the side of the main body 101 and installed perpendicular to a camera lens.

Such first optical transmitter module 131 may convert signals received from the image processing unit 120 to optical signals and transmit the optical signals to the outside. In other words, the first optical transmitter module 131 may convert signals converted to bit array to LED optical signals through a controlling unit.

The first optical receiver module 132 may be configured on wall surface of the main body 101, and receive optical signals from the outside. Here, the first optical transmitter module 131 and the first optical receiver module 132 may be a first optical transceiver module 130.

The control signal unit 140 may receive optical signals from the first optical receiver module 132 and generate control signal.

The driving unit 150 may be driven by the driving unit 150 according to control signals received from the control signal unit 140 and rotate the main body 101. For example, the driving unit 150 may be a rotation motor configured at the low part of the first optical communication module 100, and may rotate the camera or the main body 101 including the camera according to rotation of the rotation motor. At this time, a power unit (e.g., a battery) may be configured for operation of the driving unit 150.

Figure 3:
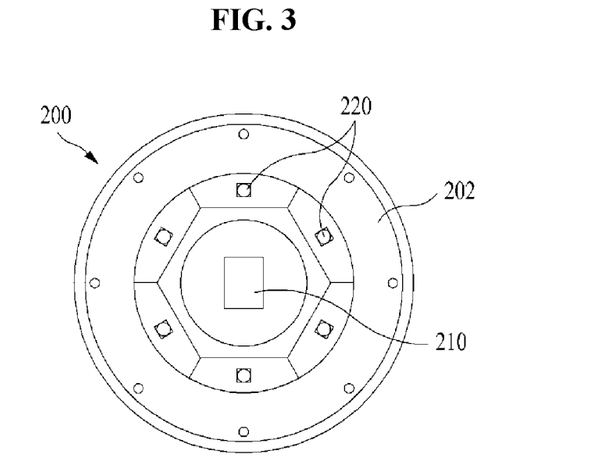
FIG. 3 is a drawing illustrating a side view of a second optical communication module according to an example of embodiments.
Figure 4:
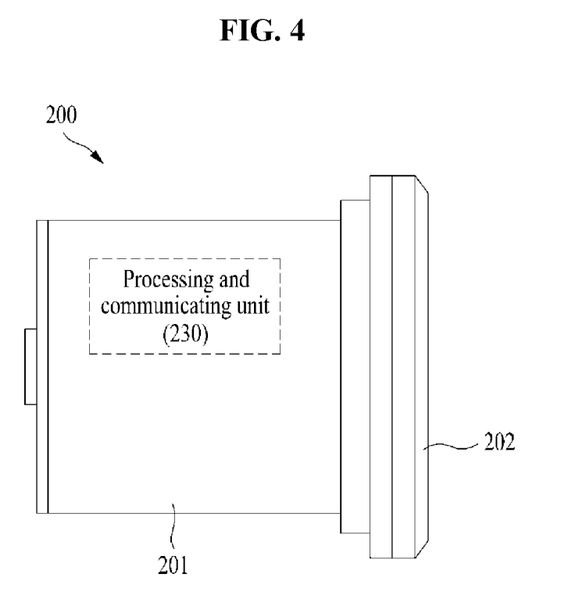
FIG. 4 is a drawing illustrating a front view of a second optical communication module according to an example of embodiments.

FIG. 3 is a drawing illustrating a side view of a second optical communication module according to an example of embodiments, and FIG. 4 is a drawing illustrating a front view of a second optical communication module according to an example of embodiments.

Referring to FIGS. 3 and 4, a second optical communication module 200 may receive image information from a first optical transceiver module of a first optical communication module through a second optical transceiver module, and transmit the received image information to an external device or a displaying unit. At this time, the second optical communication module 200 may directly transmit image information to the external device or the displaying unit, but may transmit it through a controlling unit.

The second optical communication module 200 may be an underwater optical communication module based on LED and the like installed in plural inside and outside of an aquarium in order to receive optical signals transmitted at high speed through the first optical communication module attached to an underwater creature or underwater robot or transmit control signals to an underwater robot.

For example, the second optical communication module 200 may consist of a cylinder shaped body unit 201, a second optical receiver module 210 may be configured at the center of a circular cross section part 202 of the cylinder shaped body unit 201, and a plurality of second optical transmitter modules 220 based on LED may be configured around the second optical receiver module 210.

Also, the second optical communication module 200 may further include a processing and communicating unit 230. In other words, the second optical communication module 200 may be configured to include the second optical receiver module 210, the processing and communicating unit 230, and the second optical transmitter module 220.

The second optical receiver module 210 may receive optical signals from the first optical transmitter module of the first optical communication module.

The processing and communicating unit 230 may transmit optical signals received from the second optical receiver module 210 to the external device or the displaying unit, and receive control instruction from the external device or the displaying unit. Here, the control instruction may mean receiving control signals for operation control from the external device or the displaying unit.

In addition, the second transmitter module 220 may transmit control instruction to the first optical transmitter module as control instruction.

Figure 5:
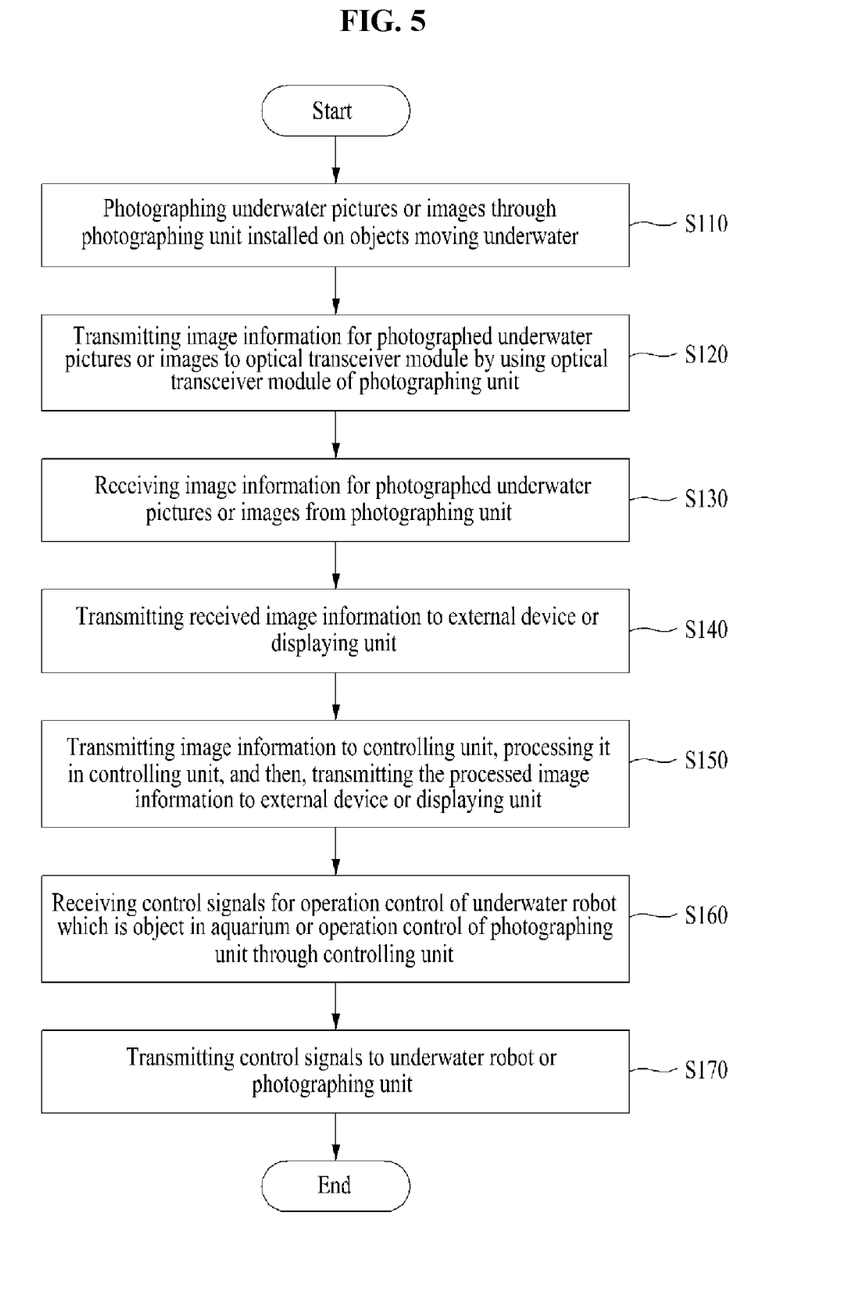
FIG. 5 is a flow chart illustrating an optical communication method capable of monitoring underwater information in real time according to an example of embodiments.

FIG. 5 is a flow chart illustrating an optical communication method capable of monitoring underwater information in real time according to an example of embodiments.

Referring to FIG. 5, an optical communication method according to an example embodiment may be configured to include receiving image information for underwater pictures or images photographed from a photographing unit installed on objects moving underwater through an optical transceiver module installed underwater or within a certain distance from underwater S130, and transmitting the received image information to an external device or a displaying unit S140.

Here, it may further include photographing underwater pictures or images through the photographing unit installed on objects moving underwater S110, and transmitting image information for the photographed underwater pictures or images to the optical transceiver module installed underwater or within a certain distance from underwater by using the optical transceiver module of the photographing unit S120.

It may further include transmitting and processing the image information in the controlling unit in order to transmit it to the external device or the displaying unit, and then, transmitting the processed image information to the external device or the displaying unit S150.

Also, it may further include receiving control signals for operation control of the underwater robot which is an object in an aquarium or operation control of the photographing unit through the controlling unit S160 and transmitting the control signals to the underwater robot or the photographing unit S170.

In the below, the optical communication method will be more specifically described with one example.

The optical communication method may be more specifically described by using the optical communication system above described. As described above, the optical communication system may be configured to include the first optical communication module and the second optical communication module, and the optical communication system may be configured to further include the controlling unit, the inputting unit, and the displaying unit.

First, underwater pictures or images may be photographed through the first optical communication module and transmitted to the second optical communication module through optical communication.

In S110, the first optical communication module may photograph underwater pictures or images through the photographing unit installed on objects moving underwater.

In S120, the first optical communication module may transmit image information for the photographed underwater pictures or images to the optical transceiver module installed underwater or within a certain distance from underwater by using the optical transceiver module of the photographing unit.

Then, the second optical communication module may receive the photographed image information from the first optical communication module and transmit the image information to the external device or the displaying unit.

In S130, the second optical communication module may be installed underwater or within a certain distance from underwater, and may receive image information for underwater pictures or images photographed from the photographing unit installed on objects moving underwater through the optical transceiver module.

In S140, the second optical communication module may transmit the received image information to the external device or the displaying unit.

In S150, the second optical communication module may transmit image information to the controlling unit and process the image information in the controlling unit in order to transmit it to the external device or the displaying unit, and then, may transmit the processed image information to the external device or the displaying unit. At this time, the controlling unit may process the received multiple image information to be selectively transmitted to the external device or the displaying unit through multiplexing and demultiplexing unit.

In S160, the second optical communication module may receive control signals for operation control of underwater robot which is an object in an aquarium or operation control of the photographing unit through the controlling unit. Here, the second optical communication module may receive input of instruction for operation control of underwater robot in the aquarium or instruction for rotation control of the photographing unit attached to underwater creature through the inputting unit of the terminal, and then, may receive control signals through the controlling unit.

In S170, the second optical communication module may transmit control signals to the underwater robot or the photographing unit.

Likewise, according to example embodiments, it is possible to photograph close-ups of various creatures, so natural behaviors of creatures may be closely observed, and behavior characteristics of creatures may be known.

Also, example embodiments have an advantage that it may display such present state of underwater ecosystem to the outside in real time, so it may provide very realistic images. By operating a number of low cost miniature underwater cameras and optical communication modules, it may simultaneously photograph various natural scenes of underwater ecosystem and show it in real time, so it may give vivid realism to visitors.

Furthermore, example embodiments may install an optical communication device integrated with the underwater camera on miniature underwater drone such as a fish robot for required real time photograph inside the aquarium, and show desired underwater ecological information in real time by controlling the underwater drone to move to the desired location.

The units described herein may be implemented using hardware components, software components, and/or a combination thereof. For example, a processing device may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Examples of program instructions include both machine code, such as produced by a compiler, and higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

The embodiments of the invention in which an exclusive property or privilege is claimed are defined as follows:

1. An optical communication system comprising:
   a first optical communication module configured with a photographing unit which is installed on an underwater creature or an underwater robot which are objects moving underwater and photographs underwater pictures or images and a first optical transceiver module for transmitting and receiving image information for the photographed underwater pictures or images;
   a second optical communication module for receiving the image information from the first optical transceiver module of the first optical communication module and transmitting the image information to an external device or a displaying unit; and
   a controlling unit for receiving and processing the image information from the second optical communication module, and then, transmitting the processed image information to the external device or the displaying unit,
   wherein the second optical communication module is installed in plural inside or outside aquarium, and transmits control signals for operation control to the underwater robot or the first optical communication module,
   wherein the controlling unit comprises a multiplexing and demultiplexing unit for processing the multiple image information received from the plurality of second optical communication modules to be selectively transmitted to the external device or the displaying unit, and transmits control signals for operation control of the underwater robot in the aquarium or operation control of the photographing unit of the first optical communication module to the second optical communication module, but selects the second optical communication module located at a distance nearest from the moving underwater robot or the first optical communication module among the plurality of second optical communication modules and transmits the control signals.

2. The optical communication system of claim 1 further comprising a displaying unit for receiving the processed image information from the controlling unit and providing the processed image information in real time.

3. The optional communication system of claim 1, wherein the first optical communication module comprises:
   a main body;
   the photographing unit consisting of a miniature camera configured on one side of the main body;
   an image processing unit for converting real-time images photographed in the photographing unit to bit array in order to transmit the images; and
   a first optical transmitter module configured on wall surface part of the main body, and converting signals received from the image processing unit to optical signals and transmitting the optical signals to the outside, and
   wherein the first optical communication module is attached to the underwater creature or underwater robot to move underwater and photographs underwater environment or another underwater creature.

4. The optical communication system of claim 3, wherein the first optical communication module further comprises:
   a first optical receiver module configured on wall surface part of the main body and receiving optical signals from the outside;
   a control signal unit receiving the optical signals from the first optical receiver module and generating control signals; and
   a driving unit driven by driving unit according to the control signals received from the control signal unit and rotating the main body.

5. The optical communication system of claim 1 further comprising an inputting unit for receiving input of instruction for controlling operation of the underwater robot in the aquarium or rotation control instruction of the first optical communication module attached to the underwater creature and transmitting the instructions to the controlling unit.

* * * * *